United States Patent
Weng

(10) Patent No.: US 8,199,797 B2
(45) Date of Patent: Jun. 12, 2012

(54) TRANSCEIVING APPARATUS AND TRANSCEIVING SYSTEM OF LOW TURN-AROUND VOLTAGE

(75) Inventor: Meng-Chih Weng, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 252 days.

(21) Appl. No.: 12/702,248

(22) Filed: Feb. 8, 2010

(65) Prior Publication Data
US 2011/0194592 A1    Aug. 11, 2011

(51) Int. Cl.
*H04B 1/38* (2006.01)
*H04L 5/16* (2006.01)
(52) U.S. Cl. .......... 375/220; 375/219
(58) Field of Classification Search .......... 375/220, 375/219
See application file for complete search history.

(56) References Cited

U.S. PATENT DOCUMENTS
2007/0077905 A1*  4/2007  Oh et al. .......... 455/264
2010/0237906 A1*  9/2010  Hayashi et al. .......... 327/65
2011/0064034 A1*  3/2011  Zhu .......... 370/329

* cited by examiner

*Primary Examiner* — David C. Payne
*Assistant Examiner* — Brian J Stevens
(74) *Attorney, Agent, or Firm* — Winston Hsu; Scott Margo

(57) ABSTRACT

A transceiving apparatus includes a transmitter module and receiver module. The transmitter module has a transmitting circuit and an auxiliary circuit. The transmitting circuit generates a first differential input signal pair when the transceiving apparatus operates in a transmitter mode (TX mode). The auxiliary circuit is coupled to the transmitting circuit, for generating a differential output signal pair according to the first differential input signal pair when the transceiving apparatus operates in the TX mode. The receiver module is coupled to the auxiliary circuit, for receiving a second differential input signal pair according to a common mode voltage when the transceiving apparatus operates in a receiver mode (RX mode). Herein the auxiliary circuit generates the common mode voltage when the transceiving apparatus operates in the RX mode.

7 Claims, 5 Drawing Sheets

TRANSCEIVING APPARATUS AND TRANSCEIVING SYSTEM OF LOW TURN-AROUND VOLTAGE

BACKGROUND OF THE INVENTION

1. Field of the Invention

The present invention relates to transmitting and receiving communication signals, and more particularly, to a transceiving apparatus and related transceiving system that can generate a common mode voltage of its receiver module by referring to the common-mode voltage of its transmitter module when the transceiving apparatus operates in the RX mode.

2. Description of the Prior Art

DisplayPort, a new interface standard from the Video Electronic Standards Association (VESA), simplifies display design and its associated connections. It also supports higher resolutions with robust electrical characteristics. Although the immediate application of the DisplayPort interface is in notebooks and display monitors, it is also designed to be robust for many embedded and internal applications, such as digital TVs.

Each transceiving apparatus applied to the DisplayPort consists of a receiver and a transmitter. In accordance with the DisplayPort specification, a turn-around voltage, which is defined as a voltage difference between the common mode voltage of the transmitter and the common mode voltage of the receiver, must be smaller than 0.4 V, regardless of the source side or sink side. Those skilled in the art should readily appreciate that it is very difficult to maintain the common mode voltage. For example, if the amplitude of the transmitter is changed, its common mode voltage will change accordingly. In addition, the total impedance should be maintained in 50 ohms. Also, there are AC coupling capacitors each having a capacitance of 100 nF and disposed between two transceiving apparatuses, such as a source side and a sink side, connected to each other. If the transceiving apparatus is switched from a transmitter mode (TX mode) to a receiver mode (RX mode), it may waste much time to transfer the common voltage of the transmitter included therein into the common voltage of the receiver included therein.

Hence, how to solve the abovementioned issues has become an important topic of designing the transceiving apparatus.

SUMMARY OF THE INVENTION

It is therefore one of the objectives of the present invention to provide a transceiving apparatus and related system that can generate a common mode voltage of its receiver module by referring to the common-mode voltage of its transmitter module when the transceiving apparatus operates in the RX mode, to solve the abovementioned problems.

According to an exemplary embodiment of the present invention, an exemplary transceiving apparatus is provided. The exemplary transceiving apparatus includes a transmitter module and a receiver module. The transmitter module has a transmitting circuit and an auxiliary circuit. The transmitting circuit generates a first differential input signal pair when the transceiving apparatus operates in a transmitter mode (TX mode). The auxiliary circuit is coupled to the transmitting circuit, and implemented for generating a differential output signal pair according to the first differential input signal pair when the transceiving apparatus operates in the TX mode. The receiver module is coupled to the auxiliary circuit, and implemented for receiving a second differential input signal pair according to a common mode voltage when the transceiving apparatus operates in a receiver mode (RX mode). Herein the auxiliary circuit generates the common mode voltage when the transceiving apparatus operates in the RX mode.

According to an exemplary embodiment of the present invention, an exemplary transceiving system is provided. The exemplary transceiving system includes two transceiving apparatuses for communicating with each other via a cable coupled between respective video interfaces thereof. Each of the transceiving apparatuses includes a transmitter module and a receiver module. The transmitter module has a transmitting circuit and an auxiliary circuit. The transmitting circuit generates a first differential input signal pair when the transceiving apparatus operates in a transmitter mode (TX mode). The auxiliary circuit is coupled to the transmitting circuit, and implemented for generating a differential output signal pair according to the first differential input signal pair when the transceiving apparatus operates in the TX mode. The receiver module is coupled to the auxiliary circuit, and implemented for receiving a second differential input signal pair according to a common mode voltage when the transceiving apparatus operates in a receiver mode (RX mode). Herein the auxiliary circuit generates the common mode voltage when the transceiving apparatus operates in the RX mode. In one embodiment, the video interface may comply with a DisplayPort specification.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
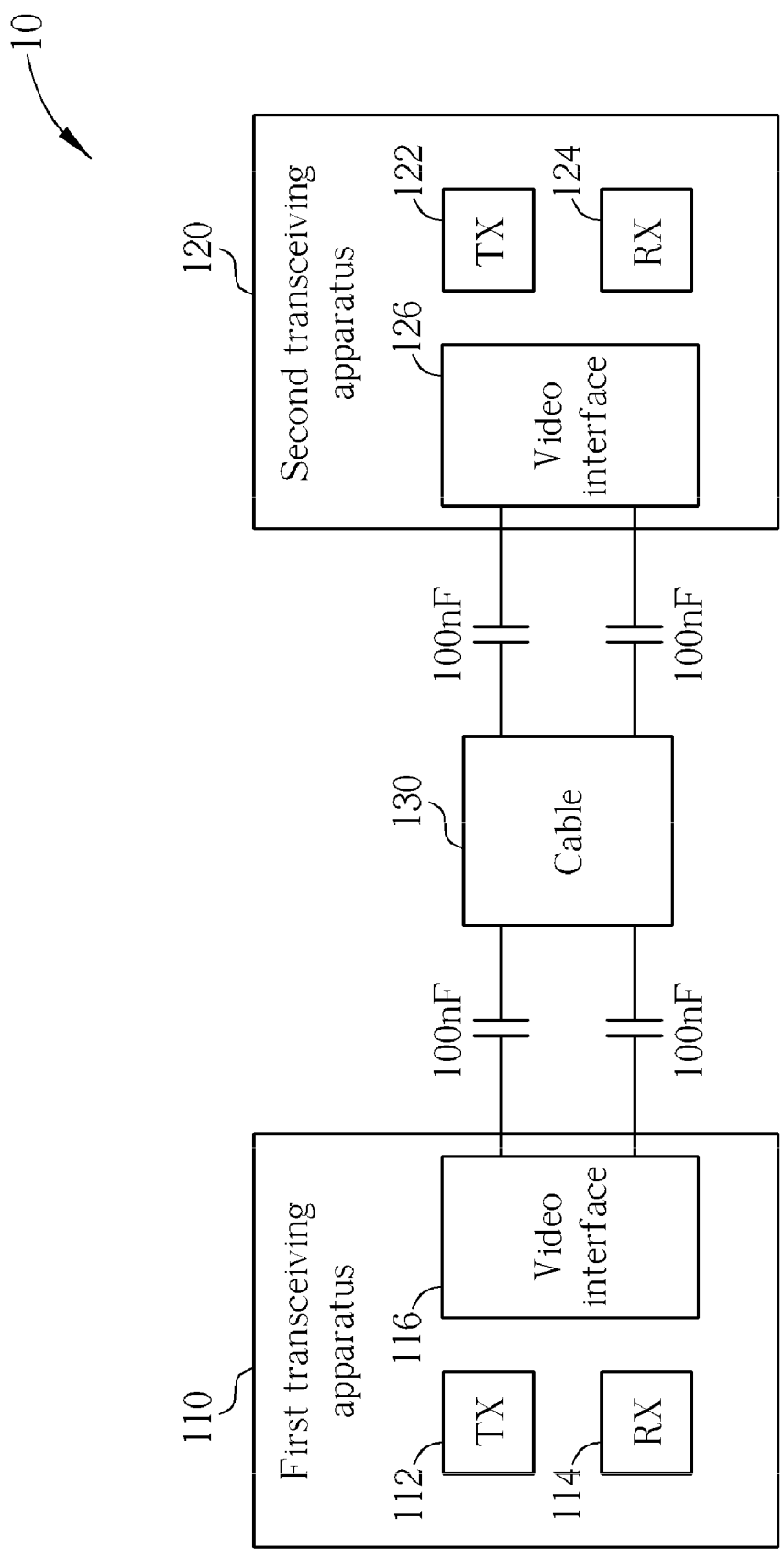
FIG. 1 is a diagram of an architecture of a transceiving system according to an embodiment of the present invention.
Figure 2:
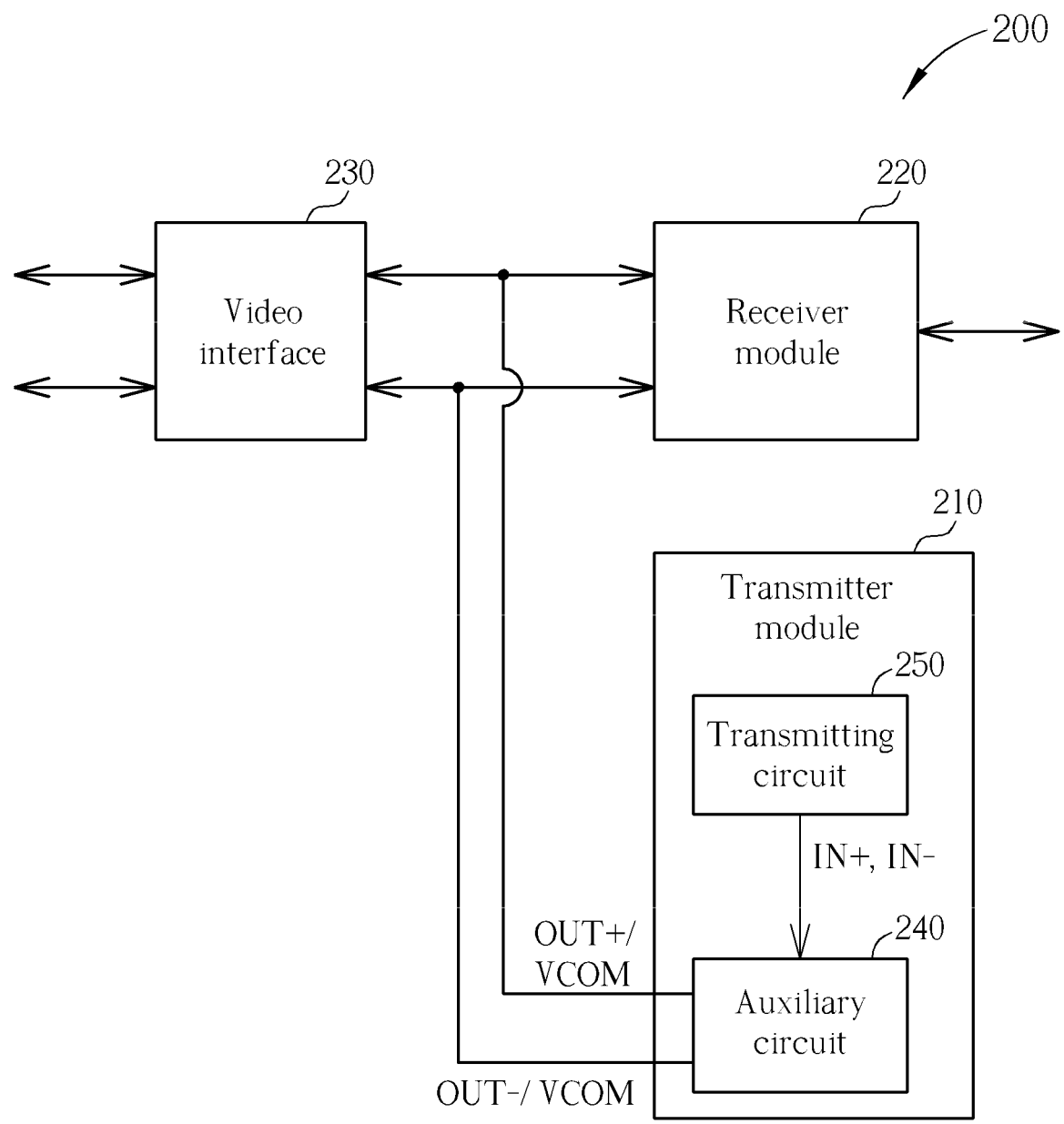
FIG. 2 is a diagram of an exemplary implementation of a transceiving apparatus according to the present invention.

Please refer to FIG. 1. FIG. 1 is a diagram of an architecture of a transceiving system 10 according to an embodiment of the present invention. In this embodiment, the transceiving system 10 complies with DisplayPort specification, but this in no way should be considered as limitations of the present invention. As shown in FIG. 1, the transceiving system 10 includes a first transceiving apparatus 110 and a second transceiving apparatus 120, wherein the first and second transceiving apparatuses 110 and 120 communicate with each other via a cable 130. For example, in this embodiment, the first transceiving apparatus 110 is used as a source device, and the second transceiving apparatus 120 is used as a sink device. Be noted that each of the first and second transceiving apparatuses 110 and 120 can serve as an auxiliary (AUX) device; that is, each of them includes a transmitter module TX denoted by a reference numeral 112/122, a receiving module RX denoted by a reference numeral 114/124 and a video interface (e.g., a DisplayPort connector) denoted by a reference numeral 116/126, as is also shown in FIG. 2. In other words, the first transceiving apparatus 110 acts as a transmitting side while the second transceiving apparatus 120 acts as a receiving side; alternatively, the first transceiving apparatus 110 acts as a receiving side while the second transceiving apparatus 120 acts as a transmitting side.

Please refer to FIG. 2. FIG. 2 is a diagram of an exemplary implementation of a transceiving apparatus according to the present invention. It should be noted that either of the first transceiving apparatus 110 and the second transceiving apparatus 120 shown in FIG. 1 can be realized using the transceiving apparatus 200 shown in FIG. 2. The exemplary transceiving apparatus 200 includes, but is not limited to, a transmitter module 210, a receiver module 220 and a video interface 230. The transmitter module 210 includes a transmitting circuit 250 and an auxiliary circuit 240. The receiver module 220 is coupled to the auxiliary circuit 240 of the transmitting module 210. The transmitting circuit 250 generates a first differential input signal pair (including a first positive input signal IN1+ and a first negative input signal IN1−) when the transceiving apparatus 200 operates in a transmitter mode (TX mode). The auxiliary circuit 240 is coupled to the transmitting circuit 250, and implemented for generating a differential output signal pair (including a positive output signal OUT+ and a negative output signal OUT−) according to the first differential input signal pair IN1+ and IN1− when the transceiving apparatus 200 operates in the TX mode. The receiver module 220 receives a second differential input signal pair according to a common mode voltage VCOM when the transceiving apparatus 200 operates in a receiver mode (RX mode). What calls for special attention is that the auxiliary circuit 240 generates the common mode voltage VCOM when the transceiving apparatus 200 operates in the RX mode. Operations and internal components of the auxiliary circuit 240 will be detailed in the following embodiments.

By way of example, but not limitation, the transmitting circuit 250 may be viewed as a first stage circuit of the transmitter module 210, and the auxiliary circuit 240 may be viewed as a last stage circuit of the transmitter module 210. Be noted that, the auxiliary circuit 240 is further coupled to input nodes of the receiver module 220 for generating and providing the desired common mode voltage VCOM to the receiver module 220 when the transceiving apparatus 200 operates in the RX mode.

Figure 3:
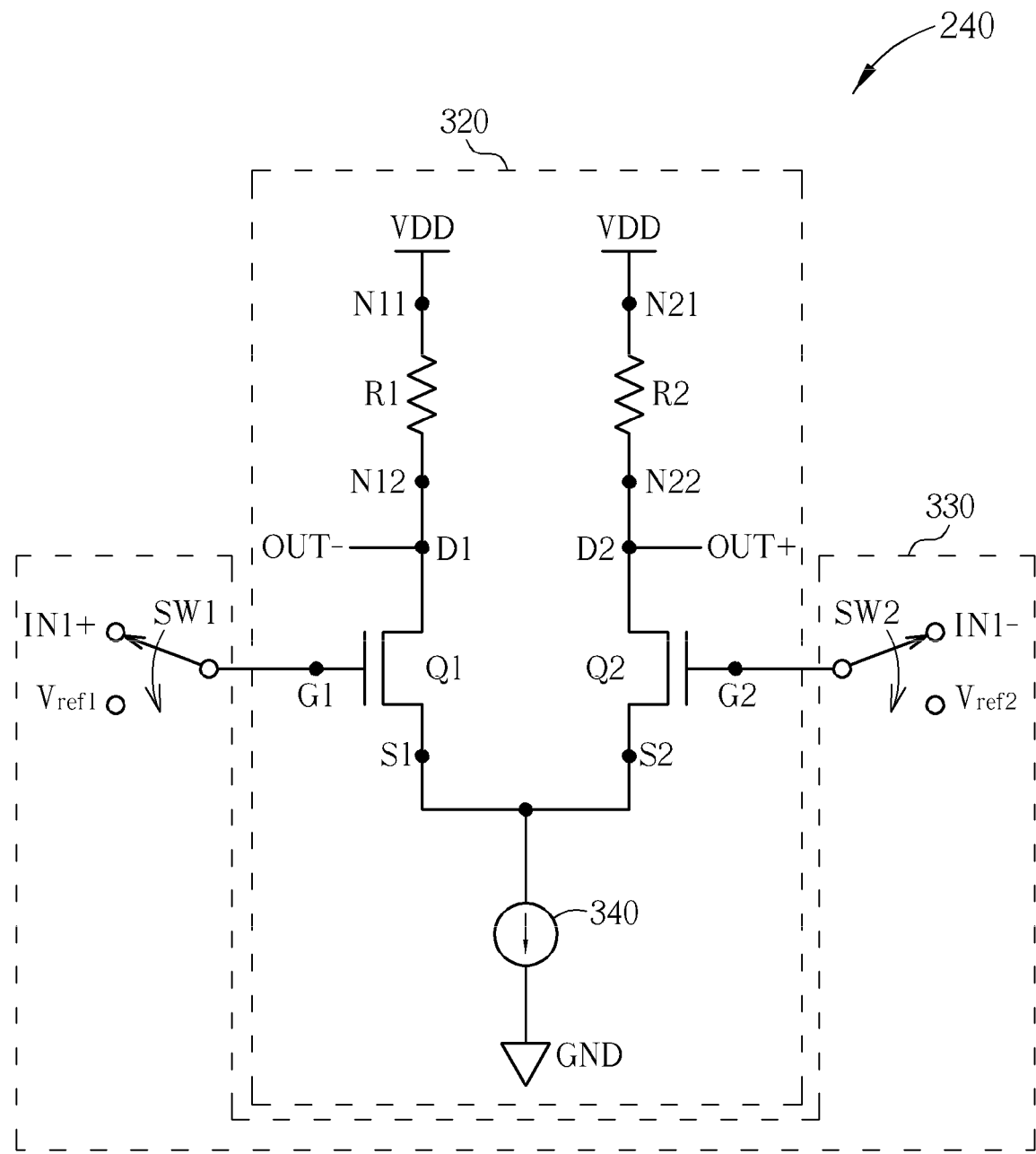
FIG. 3 is a diagram showing a detailed circuit of an auxiliary circuit of a transmitter module shown in FIG. 2.

Please refer to FIG. 3. FIG. 3 is a diagram showing a detailed circuit of the auxiliary circuit 240 of the transmitter module 210 shown in FIG. 2. As shown in FIG. 3, the auxiliary circuit 240 includes, but is not limited to, a differential circuit 320 and a control circuit 330. The differential circuit 320 has a positive input terminal, a negative input terminal, a positive output terminal and a negative output terminal. In this embodiment, the differential circuit 320 has a first resistor R1, a second resistor R2, a first transistor Q1, a second transistor Q2, and a bias circuit 340. The first resistor R1 has a first node N11 coupled to a first supply voltage VDD, and a second node N12; similarly, the second resistor R2 has a first node N21 coupled to the first supply voltage VDD, and a second node N22. The first transistor Q1 has a first electrode D1 acting as the aforementioned negative output terminal and coupled to the second node N12 of the first resistor R1, a second electrode S1, and a control electrode G1 acting as the aforementioned positive input terminal. The second transistor Q2 has a first electrode D2 acting as the aforementioned positive output terminal and coupled to the second node N22 of the second resistor R2, a second electrode S2, and a control electrode G2 acting as the aforementioned negative input terminal. In addition, the bias circuit 340 is coupled between a second supply voltage GND and the second electrodes S1 and S2 of the first and second transistors Q1 and Q2.

What calls for special attention is the control circuit 330 devised for determining which signals to be inputted to the positive input terminal G1 and the negative input terminal G2 of the differential circuit 320. In this embodiment, the control circuit 330 may be implemented by two switches SW1 and SW2, but this is merely a practicable embodiment of the present invention and is not meant to be limitations of the present invention. Herein the switch SW1 is coupled to the positive input terminal G1 of the differential circuit 320, for selecting the first positive input signal IN1+ or a first reference voltage Vref1 to be inputted to the positive input terminal G1; and the switch SW2 is coupled to the negative input terminal G2 of the differential circuit 320, for selecting the negative positive input signal IN1− or a second reference voltage Vref2 to be inputted to the negative input terminal G2. Those skilled in the art should appreciate that the control circuit 330 may be implemented by other components without departing from the spirit of the present invention, which also belongs to the scope of the present invention.

Figure 4A:
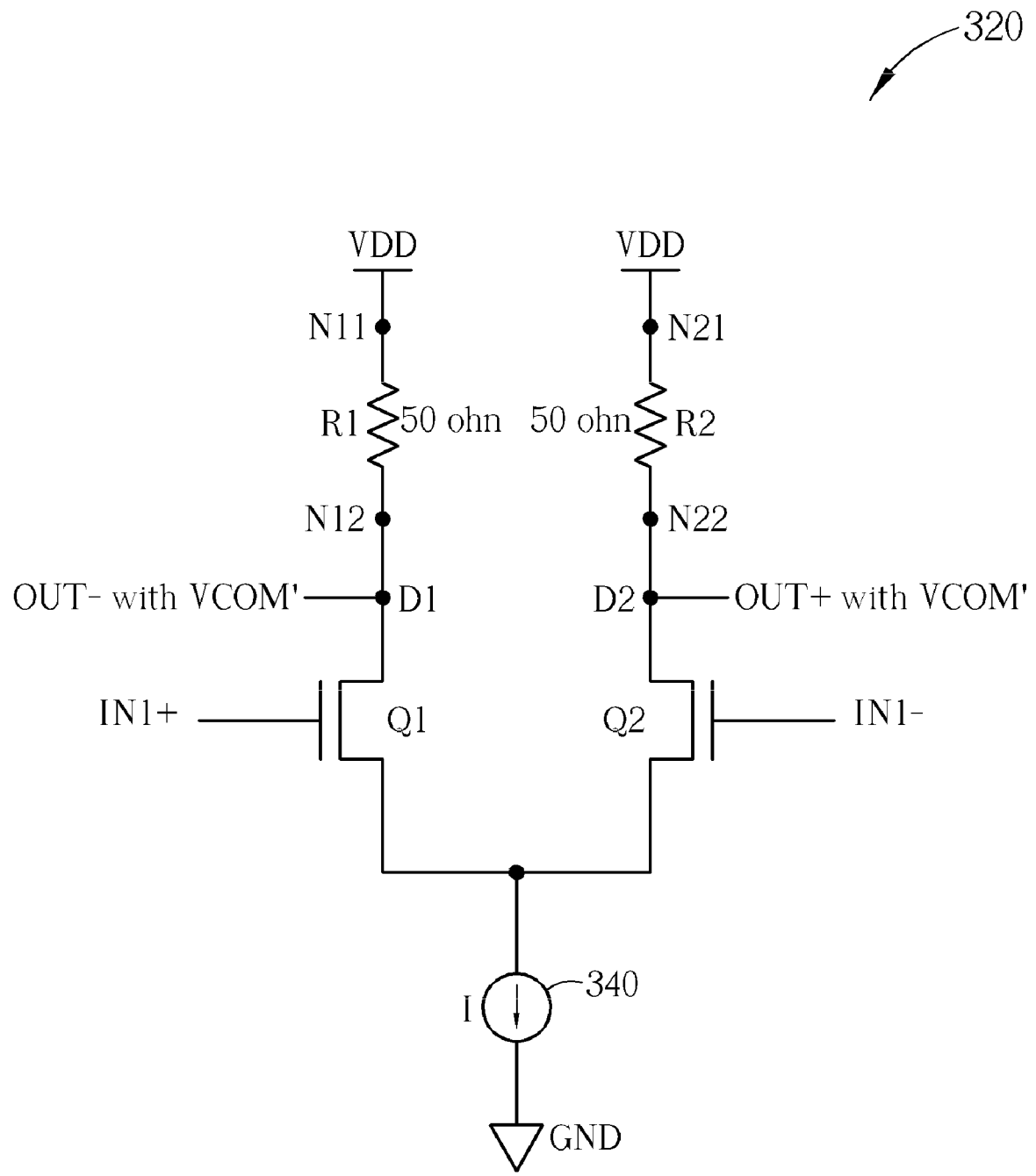
FIG. 4A is a diagram showing a differential circuit of the auxiliary circuit under a condition where the transceiving apparatus operates in the TX mode.
Figure 4B:
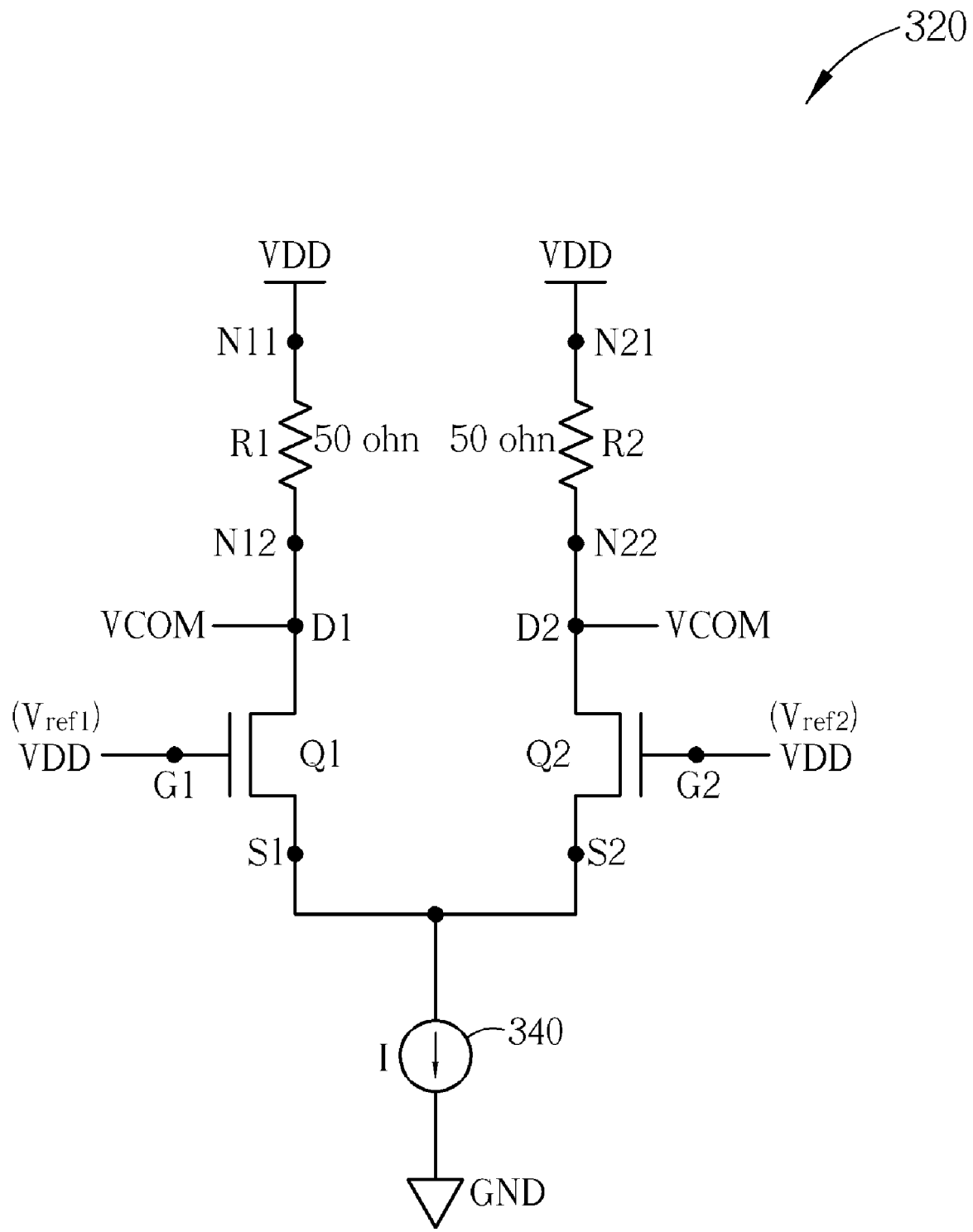
FIG. 4B is a diagram showing a differential circuit of the auxiliary circuit under a condition where the transceiving apparatus operates in the RX mode.

Moreover, the control circuit 330 is used for coupling the first differential input signal pair (including the first positive input signal IN1+ and the first negative input signal IN1−) to the positive input terminal G1 and the negative input terminal G2 when the transceiving apparatus 200 operates in the TX mode, as is also shown in FIG. 4A. The control circuit 330 is used for coupling the positive input terminal G1 and the negative input terminal G2 to the first reference voltage Vref1 and the second reference voltage Vref2, respectively, when the transceiving apparatus 200 operates in the RX mode, as is also shown in FIG. 4B. Additionally, the control circuit 330 forwards the common mode voltage VCOM generated at the positive output terminal D2 and the negative output terminal D1 to the receiver module 220 when the transceiving apparatus 200 operates in the RX mode. Further details are described hereinafter.

Please refer to FIG. 4A in conjunction with FIG. 4B. FIG. 4A is a diagram showing the differential circuit 320 of the auxiliary circuit 240 under a condition where the transceiving apparatus 200 operates in the TX mode. FIG. 4B is a diagram showing the differential circuit 320 of the auxiliary circuit 240 under a condition where the transceiving apparatus 200 operates in the RX mode. As shown in FIG. 4A, the first differential input signal pair (including IN+ and IN−) is coupled to the positive input terminal G1 and the negative input terminal G2 of the differential circuit 320. As shown in FIG. 4B, the positive input terminal G1 and the negative input terminal G2 are coupled to the first reference voltage Vref1 and the second reference voltage Vref2, respectively.

In one embodiment, the first reference voltage Vref1 can be substantially equal to the second reference voltage Vref2, but this in no way should be considered as limitations of the present invention. As an illustration, in this embodiment, each of the first reference voltage Vref1 and the second reference voltage Vref2 is substantially equal to the first supply voltage VDD. In this case, assume that each of the first resistor R1 and the second resistor R2 has an impedance of 50 ohms, and the bias current provided by the bias circuit 340 has a current level of I. As a result, when the transceiving apparatus 200 operates in the TX mode, the transmitter module 210 has a common mode voltage VCOM' presented at the positive output terminal D2 and negative output terminal D1, where the common mode voltage VCOM' is equal to (VDD−(½)*I*50) due to the auxiliary circuit 240 having the configuration shown in FIG. 4A. On the other hand, when the transceiving apparatus 200 operates in the RX mode, the auxiliary circuit 240 is responsible for providing a common mode voltage VCOM to the receiver module 220, rather than generating a transmitter output. As the first transistor Q1 and the second transistor Q2 are both turned on due to the applied reference voltages (i.e., Vref1 and Vref2), the common mode voltage VCOM generated at the positive output terminal D2 and negative output terminal D1 is (VDD−(½)*I*50) which is equal to the aforementioned common mode voltage VCOM'. To put it simply, since the transmitter common mode voltage used in the TX mode and the receiver common mode voltage used in the RX mode are both generated by the same circuit, say, the auxiliary circuit 240, a turn-around voltage, which is defined as a voltage difference between the common mode voltage VCOM' of the transmitter module 210 and the common mode voltage VCOM of the receiver module 220, must be substantially maintained at 0. Therefore, provided that the transceiving apparatus 200 is employed in a DisplayPort application (e.g., the transceiving system 10 shown in FIG. 1), the turn-around voltage can conform to the DisplayPort specification, that is, it must be smaller than 0.4V.

Moreover, it will be obvious to those skilled in the art that various modifications of the first reference voltage Vref1 and the second reference voltage Vref2 may be made without departing from the spirit of the present invention, as long as the first reference voltage Vref1 and the second reference voltage Vref2 are able to turn on the first transistor Q1 and the second transistor Q2 in the RX mode, respectively.

The abovementioned embodiments are presented merely for describing the features of the present invention, and in no way should be considered to be limitations of the scope of the present invention. In summary, the present invention provides a transceiving apparatus and a related transceiving system. When the transceiving apparatus operates in the TX mode, the auxiliary circuit 240 generates the differential output signal pair according to the first differential input signal pair IN1+ and IN1− for allowing the transmitter module 210 to accomplish its designated functionality, wherein the differential output signal pair has a common mode voltage VCOM', for example, equal to (VDD−(½)*I*50). When the transceiving apparatus operates in the RX mode, the auxiliary circuit 240 generates the common mode voltage VCOM, for example, equal to (VDD−(½)*I*50) to the receiver module 220. As a result, by making use of the auxiliary circuit of the transmitter module to provide the transmitter module with a transmitter common mode voltage in the TX mode and to generate and transmit a receiver common mode voltage to the receiver module in the RX mode, a turn-around voltage can be substantially maintained at 0, thereby satisfying requirements of a particular communication specification, such as the DisplayPort specification. In addition, only a control circuit 330 (including the two switches SW1 SW2) is required to determine which signals to be inputted to the positive input terminal and the negative input terminal of the differential circuit 320, such that the whole manufacturing cost is not increased.

Those skilled in the art will readily observe that numerous modifications and alterations of the device and method may be made while retaining the teachings of the invention.

What is claimed is:

1. A transceiving apparatus, comprising:
    a transmitter module, comprising:
        a transmitting circuit, for generating a first differential input signal pair when the transceiving apparatus operates in a transmitter mode (TX mode); and
        an auxiliary circuit, coupled to the transmitting circuit, for generating a differential output signal pair according to the first differential input signal pair when the transceiving apparatus operates in the TX mode, comprising:
            a differential circuit, having a positive input terminal, a negative input terminal, a positive output terminal and a negative output terminal; and
            a control circuit, for coupling the first differential input signal pair to the positive input terminal and the negative input terminal when the transceiving apparatus operates in the TX mode, and for coupling the positive input terminal and the negative input terminal to a first reference voltage and a second reference voltage, respectively, and coupling the common mode voltage generated at the positive output terminal and the negative output terminal to the receiver module when the transceiving apparatus operates in the RX mode; and
    a receiver module, coupled to the auxiliary circuit, for receiving a second differential input signal pair according to a common mode voltage when the transceiving apparatus operates in a receiver mode (RX mode);
    wherein the auxiliary circuit generates the common mode voltage when the transceiving apparatus operates in the RX mode.

2. The transceiving apparatus of claim 1, wherein the differential circuit comprises:
    a first resistor, having a first node coupled to a first supply voltage;
    a second resistor, having a first node coupled to the first supply voltage;
    a first transistor, having a first electrode acting as the negative output terminal and coupled to a second node of the first resistor, a second electrode, and a control electrode acting as the positive input terminal;
    a second transistor, having a first electrode acting as the positive output terminal and coupled to a second node of the second resistor, a second electrode, and a control electrode acting as the negative input terminal; and
    a bias circuit, coupled between a second supply voltage and the second electrodes of the first and second transistors.

3. The transceiving apparatus of claim 2, wherein each of the first reference voltage and the second reference voltage is substantially equal to the first supply voltage.

4. A transceiving system, comprising:
    two transceiving apparatuses, for communicating with each other via a cable coupled between respective video interfaces thereof, each of the two transceiving apparatuses comprising:
        a transmitter module, comprising:
            a transmitting circuit, for generating a first differential input signal pair when the transceiving apparatus operates in a transmitter mode (TX mode); and
            an auxiliary circuit, coupled to the transmitting circuit, for generating a differential output signal pair according to the first differential input signal pair when the transceiving apparatus operates in the TX mode, wherein the auxiliary circuit comprises:

a differential circuit, having a positive input terminal, a negative input terminal, a positive output terminal and a negative output terminal; and a control circuit, for coupling the first differential input signal pair to the positive input terminal and the negative input terminal when the transceiving apparatus operates in the TX mode, and for coupling the positive input terminal and the negative input terminal to a first reference voltage and a second reference voltage, respectively, and coupling the common mode voltage generated at the positive output terminal and the negative output terminal to the receiver module when the transceiving apparatus operates in the RX mode; and a receiver module, coupled to the auxiliary circuit, for receiving a second differential input signal pair according to a common mode voltage when the transceiving apparatus operates in a receiver mode (RX mode);

wherein the auxiliary circuit generates the common mode voltage when the transceiving apparatus operates in the RX mode.

5. The transceiving system of claim 4, wherein the differential circuit comprises:

a first resistor, having a first node coupled to a first supply voltage;

a second resistor, having a first node coupled to the first supply voltage;

a first transistor, having a first electrode acting as the negative output terminal and coupled to a second node of the first resistor, a second electrode, and a control electrode acting as the positive input terminal;

a second transistor, having a first electrode acting as the positive output terminal and coupled to a second node of the second resistor, a second electrode, and a control electrode acting as the negative input terminal; and a bias circuit, coupled between a second supply voltage and the second electrodes of the first and second transistors.

6. The transceiving system of claim 5, wherein each of the first reference voltage and the second reference voltage is substantially equal to the first supply voltage.

7. The transceiving system of claim 4, wherein the video interfaces comply with a DisplayPort specification.

* * * * *